United States Patent [19]

Khan et al.

[11] Patent Number: 5,211,724
[45] Date of Patent: May 18, 1993

[54] PARTIAL OXIDATION OF SEWAGE SLUDGE

[75] Inventors: Motasimur R. Khan, Wappingers Falls; Ronald J. McKeon, Beacon, both of N.Y.

[73] Assignee: Texaco, Inc., White Plains, N.Y.

[21] Appl. No.: 685,339

[22] Filed: Apr. 15, 1991

[51] Int. Cl.$^5$ .................................................. C10J 3/46
[52] U.S. Cl. ................................ 48/197 R; 48/197 A; 48/206; 48/DIG. 7; 252/373
[58] Field of Search .................. 48/197 R, 197 A, 202, 48/206, 209, DIG. 7; 252/373; 44/280, 281, 282, 605; 110/341, 342, 346, 347, 348; 60/39.02; 210/758, 763, 770, 774, 769

[56] References Cited

U.S. PATENT DOCUMENTS

| | | | |
|---|---|---|---|
| 3,166,032 | 1/1965 | Kleprer | 710/346 |
| 3,544,291 | 12/1970 | Schlinger et al. | 48/206 |
| 3,622,511 | 11/1972 | Pizzo et al. | 210/769 |
| 3,650,403 | 3/1972 | Aldridge | 210/769 |
| 3,687,646 | 8/1972 | Brent et al. | 48/209 |
| 3,847,564 | 11/1974 | Marion et al. | 48/95 |
| 3,926,129 | 12/1975 | Wall | 110/346 |
| 4,052,176 | 10/1977 | Child et al. | 55/32 |
| 4,081,253 | 3/1978 | Marion | 48/197 |
| 4,159,684 | 7/1979 | Kirkup | 210/769 |
| 4,193,206 | 3/1980 | Moffet | 210/769 |
| 4,321,151 | 3/1982 | McMullen | 210/769 |
| 4,875,906 | 10/1989 | Apel | 48/DIG. 7 |
| 4,933,086 | 6/1990 | McMahon et al. | 210/603 |
| 4,983,296 | 1/1991 | McMahon et al. | 210/769 |
| 4,983,296 | 1/1991 | Mcmahon et al. | 210/603 |
| 4,988,442 | 1/1991 | Highsmith et al. | 210/774 |

OTHER PUBLICATIONS

Perry's Chemical Engineers' Handbook, McGraw-Hill, Fourth Edition, 1963, pp. 19-50.

Primary Examiner—Peter Kratz
Attorney, Agent, or Firm—James J. O'Loughlin; Albert Brent

[57] ABSTRACT

An improved process for the low-cost disposal of noxious sewage sludge in a safe way without polluting the environment. In the process, sewage sludge having a solids content of about 0.5 to 20 wt.% is concentrated by pressing in a belt filter press, optionally followed by pressing in a high intensity press. It was unexpectedly found that the morphology of the resulting dewatered sewage sludge is changed by such mechanical treatment so that slurries with higher concentrations of solids are achieved. The dewatered sewage sludge is heated, flash evaporated and/or centrifuged, and mixed with a supplemental fuel e.g., liquid hydrocarbonaceous and/or solid carbonaceous fuel to produce a pumpable fuel slurry having a total solids content in the range of about 50 to 70 wt.% and comprising about 10 to 40 wt.% dewatered sewage sludge and having a higher heating value in the range of about 5,000 to 14,000 BTU/Lb. The fuel slurry may be reacted by partial oxidation in a conventional gasifier to produce synthesis gas and/or fuel gas. The thermal energy in hot byproduct steam and flue gas streams are used to heat the dewatered sewage sludge. In one embodiment, the pumpable slurry of dewatered sewage sludge and supplemental fuel is burned by complete combustion in a furnace or incinerator for the production of steam.

10 Claims, 1 Drawing Sheet

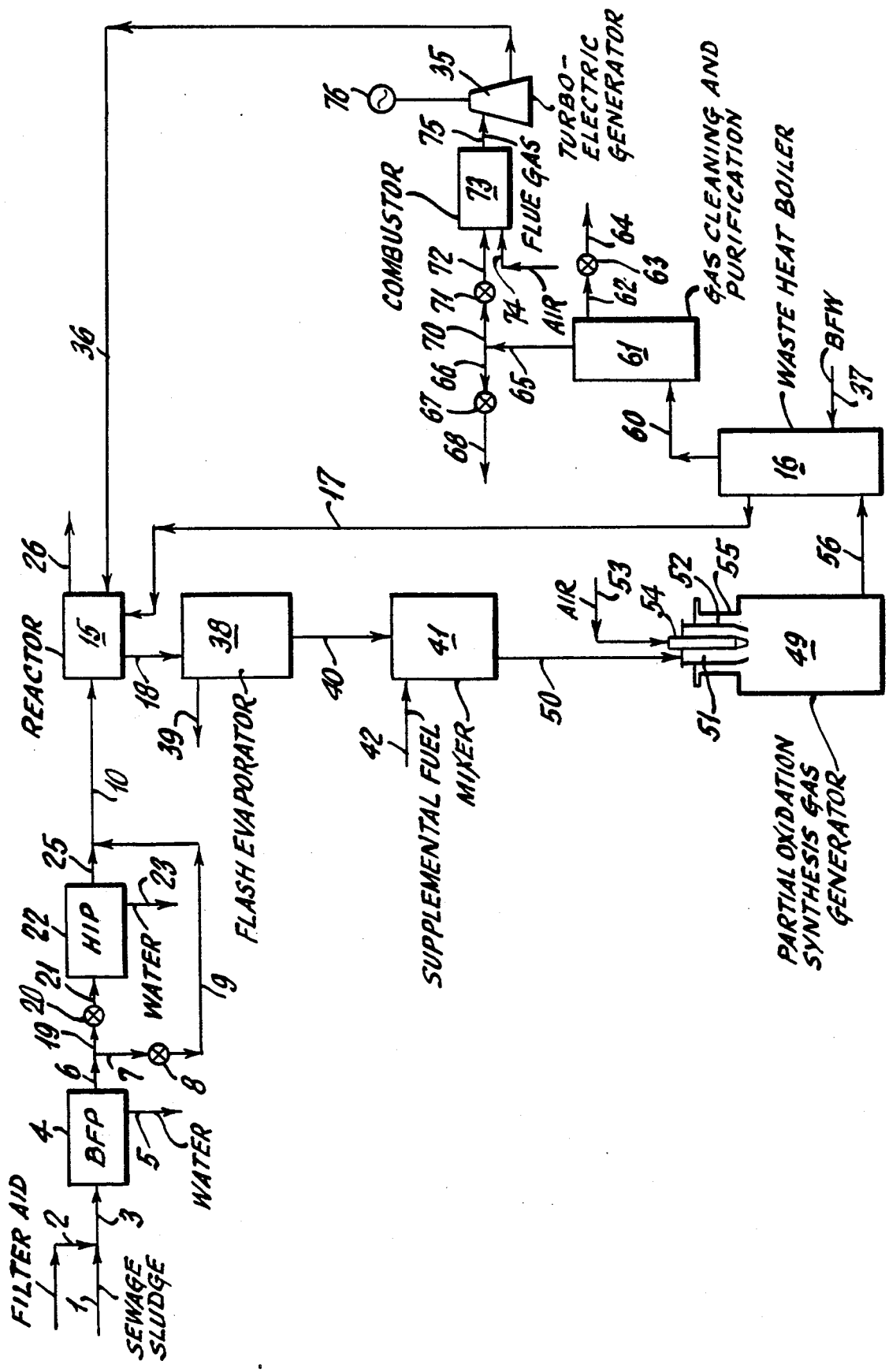

PARTIAL OXIDATION OF SEWAGE SLUDGE

FIELD OF THE INVENTION

This invention relates to a partial oxidation process for disposing of sewage sludge without polluting the nation's environment.

With landfills closing, ocean dumping being curtailed, and high-technology incinerators becoming unpopular in many areas, communities are finding that it is getting increasingly more difficult and expensive to dispose of their sewage sludge. The term "sewage sludge" as used herein may be broadly defined as "water-carried wastes", particularly from municipal sanitary sewage lines, containing at least one of the following: body wastes (excreta), household wastes, community waste such as street washings, etc., and industrial wastes and sludges. The total solids content of the sewage in municipal lines is usually about 500 parts per million (p.p.m.) or more. The solids in sewage are mostly animal or vegetable substances, "organic matter", i.e., fats, carbohydrates, and proteins. Some mineral or inorganic constituents present include sand and clay, as well as the common mineral salts found in the water supply. Sewage sludge is obtained from raw sewage and may contain a number of pathogens known to be health hazards to humans. Almost any type of organism may be found in sewage, including bacterial, protozoa, spores and cysts.

Gasification of sewage sludge is described in coassigned U.S. Pat. No. 3,687,646, which is incorporated herein by reference. Upgrading aqueous slurries of sewage sludge by shearing without heating is described in coassigned U.S. Pat. No. 4,933,086. Agglomerating the organic matter in aqueous slurries of sewage sludge by heating, is described in coassigned U.S. Pat. No. 4,983,296. However, none of these references taken singly or in combination, teach or suggest the subject invention in which highly dewatered sewage sludge is produced by pressing and is then heat treated, flash evaporated, mixed with supplemental fuel, and introduced into a partial oxidation gas generator along with free-oxygen containing gas and a temperature moderator. A hot raw effluent gas stream comprising at least one of the following is produced: synthesis gas, reducing gas and fuel

SUMMARY OF THE INVENTION

This relates to a partial oxidation process for disposing of sewage sludge without contaminating the environment comprising:

(1) concentrating sewage sludge containing about 0.5 to 20 wt.% solids to produce highly dewatered sewage sludge comprising about 15 to 65 wt.% solids, and separating excess water from said dewatered sewage sludge;

(2) heating the sewage sludge produced in (1) in a reaction zone at a temperature in the range of about 130° F. to 200° F. in the absence of air for a residence time of about 1 to 20 minutes and at atmospheric pressure, followed by heating at a temperature in the range of about 300° F. to 650° F. in the absence of air for a residence time of about 5 to 120 minutes and at a pressure which is at or above the vapor pressure of water at the heat treating temperature to produce a pumpable aqueous slurry of sewage sludge;

(3) reducing the pressure and corresponding temperature of the aqueous slurry of sewage sludge from (2) in a flash evaporization zone to a pressure in the range of about atmospheric pressure to the saturated vapor pressure of water at the temperature in said flash evaporation zone which is in the range of about 200° F. to 400° F. thereby evaporating and separating sufficient water from said sewage sludge to provide a pumpable slurry of dewatered sewage sludge having a solids content in the range of about 30 to 70 wt.% and having a higher heating value (HHV) in the range of about 5,000 to 9,500 BTU/LB;

(4) mixing the slurry of dewatered sewage sludge from (3) with a supplemental fuel thereby providing a pumpable slurry having a total solids content in the range of about 50 to 70 wt.% and comprising about 10 to 40 wt.% dewatered sewage sludge and having a higher heating value in the range of about 5,000 to 14,000 BTU/LB; and, (5) partially oxidizing the pumpable slurry from (4) with a stream of free-oxygen containing gas and a temperature moderator in the reaction zone of a gas generator at a temperature in the range of about 1800° F. to 3000° F. and a pressure in the range of about 1 to 30 atmospheres to produce a hot raw effluent stream of at least one gas from the group consisting of synthesis gas, reducing gas and fuel gas.

Another embodiment relates to a process for the partial oxidation of sewage sludge comprising:

(1) concentrating sewage sludge containing about 0.5 to 20 wt.% solids by pressing said sewage sludge in a conventional continuous belt filter press optionally followed by pressing in a conventional continuous high intensity press thereby producing highly dewatered sewage sludge comprising about 15 to 65 wt.% solids, and separating excess water from said dewatered sewage sludge;

(2) heating the sewage sludge from (1) in a reaction zone at a temperature in the range of about 130° F. to 260° F. in the absence of air for a residence time of about 1 to 20 minutes and at atmospheric pressure followed by heating at a temperature in the range of about 300° F. to 650° F. in the absence of air for about 5 to 120 minutes and at or above the vapor pressure of water at the heat treating temperature to produce a pumpable aqueous slurry of sewage sludge; and within said heat treating zone, said dewatered sewage sludge is in indirect contact with a hot stream of flue gas; and wherein said flue gas is produced downstream in the process;

(3) reducing the pressure and corresponding temperature of the aqueous slurry of sewage sludge from (2) in a flash evaporization zone to a pressure in the range of about atmospheric pressure to the saturated vapor pressure of water at the temperature in said flash evaporation zone which is in the range of about 200° F. to 400° F. thereby evaporating and separating sufficient water from said sewage sludge to provide a pumpable slurry of dewatered sewage sludge having a solids content in the range of about 30 to 70 wt.% and having a higher heating value (HHV) in the range of about 5,000 to 9,500 BTU/LB;

(4) introducing said pumpable slurry of dewatered sewage sludge from (3) into the reaction zone of a partial oxidation gas generator by way of one passage of a multi-passage annular-type burner while simultaneously passing through other passages of the burner a stream of free-oxygen containing gas and a separate supplemental fuel stream selected from the group consisting of liquid hydrocarbonaceous fuel, solid carbonaceous fuel, aqueous slurry of solid carbonaceous fuel, and mixtures thereof;

(5) reacting said materials in said partial oxidation reaction zone in (4) at a temperature in the range of about 1800° F. to 3000° F. and at a pressure in the range of about 1–30 atmospheres to produce a hot raw effluent gas stream comprising at least one of the following: synthesis gas, reducing gas and fuel gas;

(6) cooling, cleaning, and purifying a stream of fuel gas from (5); and (7) burning said fuel gas from (6) in a gas turbine thereby producing mechanical power and a discharge stream of flue gas and passing said stream of flue gas in indirect heat exchange with said dewatered sewage sludge in into the heat treating zone in (3) as provided in (2).

BRIEF DESCRIPTION OF THE DRAWINGS

The invention will be further understood by reference to the accompanying drawing. The drawing is a schematic representation of a preferred embodiment of the process.

DESCRIPTION OF THE INVENTION

Sanitary sewage sludge is disposed of by the process of the subject invention without polluting the nation's environment. In this process, highly dewatered sewage sludge is produced by pressing and is then heat treated, flash evaporated, mixed with supplemental fuel, and reacted in a partial oxidation gas generator along with free-oxygen containing gas and a temperature moderator. A hot raw effluent gas stream comprising at least one of the following is produced: synthesis gas, reducing gas and fuel gas.

The parts by weight of supplemental carbonaceous fuel to dewatered sewage sludge are respectively in the range of about 5–7 to 0.5–2, such as about 6:1. The dewatered sewage sludge and supplemental carbonaceous fuel are reacted with a free oxygen-containing gas by partial oxidation in a free-flow non-catalytic gas generator. Noxious sewage sludge is safely disposed of by the subject process without polluting the nation's environment. In addition, at least one useful nonpolluting gas from the group consisting of: synthesis gas, reducing gas and fuel gas is produced along with by-product steam and hot water. Non-contaminating ash and slag are separated from the gas stream. The ash and slag may be used for road bed fill and for making cement blocks. Further, the subject process allows a greater amount of sewage sludge to be fed to a partial oxidation gasifier, while requiring less energy per unit mass of sewage sludge processed. This process has the following advantages:

(a) Noxious sewage or industrial sludge is disposed of without polluting the environment and clean fuel gas and/or synthesis gas is produced.

(b) By-product fuel gas from the partial oxidation gasifier may be used as fuel in a turbo-electric generator. By-product synthesis gas may be used in the catalytic synthesis of organic chemicals e.g. methanol.

(c) The process utilizes waste heat derived from flue gas. Normally, this heat is rejected to the atmosphere, since it is at too low of a temperature to be economically recovered into the power cycle.

(d) The slag produced during the partial oxidation of the mixed feed of sludge and solid carbonaceous fuel is free of pollutants, and is non-hazardous. Further, it is non-leachable. (e) The process has a high thermal efficiency. Internally generated steam produced in a waste heat boiler and/or water produced in the flash evaporation zone may be used to heat the dewatered sewage sludge. The steam may be also used as the working fluid in an expansion turbine.

A typical ultimate analysis of the combustibles in sewage sludge is shown in Table I. A typical ultimate analysis of inert non-combustible materials in sewage sludge is shown in Table II. The higher heating value (BTU/lb) of dry sewage sludge is in the range of about 3000 to 7000.

TABLE I

| TYPICAL ULTIMATE ANALYSIS OF SEWAGE SLUDGE | |
|---|---|
| LEMENT | WT. % |
| CARBON | 29–50 |
| HYDROGEN | 4–6 |
| NITROGEN | 4–5 |
| OXYGEN | 12–30 |
| SULFUR | 1–3 |
| ASH | 20–46 |

TABLE II

| TYPICAL ANALYSIS OF INERT NON-COMBUSTIBLE MATERIALS IN SEWAGE SLUDGE | |
|---|---|
| ELEMENT | MG/KG DRY SOLIDS |
| Total Sodium | 1,515 |
| Water Soluble Sodium (mg/l) | 83 |
| Total Potassium | 800 |
| Water Soluble Potassium (mg/l) | 53 |
| Arsenic | 4.58 |
| Beryllium | 0.38 |
| Cadmium | 3.27 |
| Chromium | 244 |
| Copper | 289 |
| Iron | 150 |
| Lead | 147 |
| Zinc | 468 |
| Nickel | 63 |
| Mercury | 0.68 |

The economics of gasifying sewage sludge depend greatly on the tipping fee received from the sludge generating community and the concentration of sewage sludge that can be included in a pumpable slurry destined for the gasifier. Mixtures of dewatered sewage containing about 20 to 50 wt.% of solids and solid carbonaceous fuel e.g. coal that contain sufficient sewage sludge to be profitably burned are ordinarily too viscous to be pumped. This problem and others have been overcome by the subject invention.

Sewage Sludge is obtained from raw sewage by conventional processing steps and equipment. For example, the sewage from municipal sewage lines is passed through bar screens for the removal of large pieces of stone, wood, metal, and other trash which would clog channels or damage pumps. Coarse heavy inorganic noncombustibles, i.e. gravel, cinders, and sand are then settled out in a grit chamber. The sewage is then separated into an aqueous suspension of sewage sludge and liquids. Concentration of the sewage may be accomplished by any suitable way for separating solids and liquids, e.g. gravity settling, filtration, centrifugation, hydroclone, or a combination thereof. For example, a preferable preliminary procedure is to introduce the screened over-flow from the grit chamber into a primary sedimentation tank such as a continuous clarifier as shown in Perry's Chemical Engineers' Handbook, McGraw-Hill, Fourth Edition, 1963, page 19-50. Detention time in the sedimentation tank is sufficient for producing a pumpable aqueous slurry of primary sludge having a solids content of about 0.5 to 20 wt.%, in about 1 to 24 hours. The primary sedimentation tank may also serve as a hold-up tank to even out discontinuities in the sewage composition. Alternatively, a separate holding tank may be used. In one embodiment, a pumpable aqueous slurry of secondary sewage sludge is introduced into the holding tank and mixed with the primary sewage sludge. Secondary sewage sludge has a solids content in the range of about 1 to 10 wt.% and is derived from the liquid overflow from the previously mentioned primary sedimentation tank. The liquid overflow is processed in a conventional manner in order to produce secondary sewage sludge and to reduce the BOD and organic solids content and to purify and demineralize the waste water which is separated from the secondary sewage sludge. Treatment of the liquid overflow from the primary sedimentation tank may include a combination of any or preferably all of the following steps, depending upon the end use of the water: Ph adjustment; reduction of organic solids and BOD to about 20 parts per million or below, preferably by aerated biochemical treatment; clarification, optionally with coagulation; filtration or centrifugation; demineralizing; activated carbon treatment; and disinfection to control bacteria for example by chlorination. Excessively acidic or basic waste waters may be neutralized and the pH adjusted to a level in the range of about 6 to 9. Anaerobic and aerobic biological treatment processes are preferably used to economically abate the bacterial oxygen-consuming pollution caused by the discharge of waste water contaminated with low concentrations of organic matter. Suitable conventional biological processes that may be used include activated sludge units, aerated stabilization basins, and trickling filters. For additional description, see coassigned U.S. Pat. Nos. 3,687,646; 4,933,086; and 4,983,296, which are incorporated herein by reference.

The purified water may be then used subsequently in the process. For example, it may be used as a coolant of the product gas from the partial oxidation gasifier by direct contact in a quench tank or by indirect heat exchange in a waste heat boiler. By-product steam may be produced after dissolved solids are removed. The hot water or steam may be used for indirect heat exchange with other streams in the subject process. For example, to preheat and thereby agglomerate the aqueous suspension of sewage sludge in a manner to be further described. Excess water may be discharged from the system or used externally for industrial applications.

The sludge underflow from the primary sedimentation tank comprising primary sewage sludge or from the holding tank comprising primary sewage sludge in admixture with about 0 to 50 wt.% (basis total sewage sludge) of secondary sewage sludge is dewatered further to produce a thickened aqueous suspension. In one step of the subject process, sewage sludge having a solids content in the range of about 0.5 to 20 wt.% is preferably concentrated by continuous belt filter pressing to produce a highly dewatered sewage sludge having a solids content in the range of about 15 to 65 wt.%, such as about 30 to 40 wt.%, say 35 wt.%. It was unexpectedly found that the morphology of sewage sludge is changed by said mechanical treatment of the sewage sludge. For example, bound water is released and slurry making is optimized. Pumpable slurries containing a higher concentration of solids can be achieved by means of such mechanical dewatering equipment. By means of conventional continuous belt pressure filters, the sewage sludge is pressed between two moving belts that pass between and over rollers. A surface pressure in the range of about 20 to 200 pounds per square inch (psi) for a period in the range of about ⅛ to 60 minutes, such as about 1 to 30 minutes, say about 3 minutes is applied to the sewage sludge. Liquid water is thereby quickly pressed from the sewage sludge. For example, the Andritz Co., Arlington, Tx. Continuous Press Filter (CPF) operating at ambient conditions with a surface pressure of about 20 psi will produce a press cake having a solids content in the range of about 20 to 50 wt.%. Optionally, on discharge from the CPF, the press cake may be optionally further dewatered in an Andritz Co. High Intensity Press (HIP) continuous belt filter press operating with a surface pressure of about 200 psi for a similar period of about ⅛ to 60 minutes to produce press cake having a solids content in the range of about 25 to 55 wt.% Optionally, additional dewatering may be provided by heating the sludge to a temperature in the range of about 100° to 140° C. during said high intensity pressing. If further dewatering is required, the press cake from the CPF is conditioned with a conventional inorganic filter additive(~5-30 wt% e.g., $CaCO_3$ or coal having a particle size of less than about 2 mm, such as about 1 mm and with or without steam. In one embodiment the filter aid is selected from the group consisting of coal fines, petroleum coke fines, and mixtures thereof. In another embodiment the filter-aid is selected from the group consisting of iron compounds, calcium compounds, silicon compounds, and mixtures thereof. The solids content of the press cake from the HIP may be thereby increased to about 35 to 65 wt.%. In one embodiment, the sewage sludge is concentrated by a combination of continuous belt pressure filtering and centrifuging.

Heat treating of the highly dewatered sewage sludge takes place in the next step of the process. The highly dewatered sewage sludge is preheated at a temperature in the range of about 130° F. to 200° F. in the absence of air for about 1 to 20 minutes and at ambient atmospheric pressure followed by heating at a temperature in the range of about 350° F. to 650° F. in the absence of air for a residence time of about 5 to 120 minutes and at a pressure which is at or above the vapor pressure of water at the heat treating temperature to produce a pumpable aqueous slurry of sewage sludge. Thus, the dewatered sewage sludge is heated by direct or indirect heat exchange in an autoclave. For example, steam or partially cooled synthesis gas produced downstream in the process may be passed in direct or indirect heat exchange with the sewage sludge. Heat treating the dewatered sewage sludge at a temperature in the range of about 300° F. to 650° F. as previously described causes decarboxylation and dehydrogenation of the sewage sludge Sewage sludge with a particle size in the range of about 5 to 20 microns is thereby produced. Pumpable aqueous slurries of sewage sludge having greater solids contents are thereby produced. Off-gas from the reactor e.g. autoclave comprising $CO_2$, $H_2O$, $H_2S$ and COS is sent to a conventional odor control unit or disinfecting zone. Noxious gases are thereby safely disposed of without polluting the nation's environment.

In one embodiment, hot clean water at a temperature in the range of about 300° F. to 500° F. may be removed from the bottom of the reactor and may be used in indirect heat exchange with the sewage sludge going to the reactor.

The pumpable aqueous slurry from the reactor is introduced into a flash evaporation zone where the pressure is reduced to a pressure in the range of about atmospheric pressure to the saturated vapor pressure of water at the temperature in flash evaporization zone in the range of about 200° F. to 400° F. Sufficient water is thereby evaporated and separated from the sewage sludge in the flash evaporization zone to provide a pumpable slurry of dewatered sewage sludge having a solids content in the range of about 30 to 70 wt.%. The higher heating value (HHV) of this dewatered sewage sludge is in the range of about 5,000 to 9,500 BTU/Lb, such as about 5,500 to 7,000 BTU/Lb, say about 6,500 BTU/Lb. All of the higher heating values expressed herein are on the dry basis for the materials. Optionally, at least a portion of the water separated in the flash evaporization zone may be passed at a temperature in the range of about 200° F. to 500° F. in direct or indirect heat exchange with the sewage sludge in the autoclave. The thermal efficiency of the process is thereby improved. Optionally, the flash evaporation step may be followed by a centrifuging step to remove water. In still another embodiment, the flash evaporation step is replaced by the steps of cooling the heated pumpable aqueous slurry from the reactor to a temperature in the range of about ambient to 200° F., and separating sufficient water from the sewage sludge by means of a conventional centrifuge. A pumpable slurry of dewatered sewage sludge is thereby provided having a solids content in the range of about 30 to 70 wt.%. The higher heating value (HHV) of this dewatered sewage sludge is in the range of about 5,000 to 9,500 BTU/Lb., such as about 5,500 to 7,000 BTU/Lb.

A supplemental fuel having a HHV in the range of about 6,000 to 18,000 BTU/Lb is mixed with the dewatered sewage sludge from the flash evaporization more so as to produce a pumpable slurry of dewatered sewage sludge and supplemental fuel containing about 10-40 wt.% of sewage sludge and having a total solids content in the range of about 50 to 70 wt.%, such as about 50 to 65 wt.% and a HHV in the range of about 5,000 to 14,000 BTU/Lb, such as about 7,000 to 12,000 BTU/Lb, say 9,000 BTU/Lb. The parts by weight of supplemental carbonaceous fuel to said dewatered sewage sludge are respectively in the range of about 5-7 to 0.5-2, such as about 6 parts by weight of supplemental fuel to 1 part by weight of said dewatered sewage sludge. Optionally, condensed water from the flash evaporator may be used to prepare aqueous slurries of solid carbonaceous fuel. These aqueous slurries are then mixed with said supplemental fuel.

When an aqueous suspension of ordinary sewage sludge having a solids content of above about 20 wt.% is mixed with coal, a very viscous slurry is produced. Thus, when an ordinary aqueous sewage sludge slurry is mixed with particles of coal or with an aqueous-coal slurry to form an aqueous sewage sludge-coal slurry having a solids content in the range of about 50 to 60 wt.% the resulting slurry is so viscous that it can not be pumped with any degree of reliability. However, this deficiency has now been overcome by the subject invention, by which a pumpable aqueous sewage sludge slurry and supplemental fuel feed to a partial oxidation gasifier is produced having a total solids content of about 50 to 70 wt. %. The amount of solids in the total fuel feed which is contributed to by the sewage sludge is in the range of about 10 to 30 wt. %, such as about 20 to 30 wt.%. The remainder of the solids in the total fuel feed to the gasifier is contributed by the supplemental fuel. This is an economic advantage because the profit that can be made from the subsequent gasification of sewage sludge is determined by the percentage of sewage sludge in the sewage sludge-supplemental fuel feed to the partial oxidation reaction zone. The expression "and/or" is used herein in its normal sense. For example, it may mean that the supplemental fuel is a material selected from the group consisting of material A, material B and mixtures thereof.

The supplemental fuel that is gasified by partial oxidation along with the highly dewatered sewage sludge may be a solid carbonaceous fuel having a higher heating value (HHV) of at least about 14,000 BTU/Lb (dry basis) or a liquid hydrocarbonaceous fuel having a HHV of at least about 10,000 BTU/Lb. In one embodiment, the supplemental fuel is a gaseous hydrocarbonaceous fuel e.g. fuel gas having a HHV of at least about 75 BTU per standard cubic foot. Preferably, the solid carbonaceous fuel is an aqueous slurry of coal and/or petroleum coke which are preground to a particle size so that 100 wt.% passes through an ASTM E11 Standard Sieve Designation 1.40 mm. Alternative #14. The term coal includes anthracite, bituminous, subbituminous, coke from coal, lignite, residue derived from coal liquefaction, and mixtures thereof. Petroleum coke is made from conventional delayed or fluid coking processes. After mixing with highly dewatered sewage sludge as produced herein, the resulting pumpable aqueous slurry of dewatered sewage sludge and solid carbonaceous fuel has a solids content in the range of about 50 to 70 wt.% and has a higher heating value (HHV) of at least about 5,000 BTU/Lb (dry basis). The viscosity is in the range of about 500 to 3,000 centipoise.

The highly dewatered sewage sludge from the flash evaporator is pumped by a high pressure sludge charge pump and mixed in-line or in a mixing vessel with aqueous coal and/or petroleum coke slurry stream from the coal slurry charge pump. A pumpable fuel stream is produced having a higher heating value (HHV) of at least 5,000 BTU/LB. This stream is then fed to the partial oxidation reaction zone of the gasifier. In another embodiment, the highly dewatered sludge stream from the flash evaporator is pumped by a high pressure sludge charge pump and mixed at the burner tip in the gasifier with the supplemental fuel and free-oxygen containing gas. For example, separate s&reams of free-oxygen containing gas and aqueous coal and/or petroleum coke are passed through separate passages in the burner. The resulting, combined streams react by partial oxidation in the reaction zone of the gasifier. This process allows for a higher content of sludge to be gasified while still dealing with a pumpable slurry. Thus, a greater amount of sewage sludge may be fed to the gasifier, while requiring less energy per unit mass of sludge processed. Further, the gasifier burner atomizes the fuel feedstream adequately to avoid any flame stability problems.

The fuel feedstream, for example the aqueous slurry of sewage sludge and coal and/or petroleum coke and a stream of free-oxygen containing gas are introduced into a free-flow unobstructed down-flowing vertical refractory lined steel wall pressure vessel where the partial oxidation reaction takes place. A typical gas generator is shown and described is coassigned U.S. Pat. No. 3,544,291, which is incorporated herein by reference.

A two or three stream annular type burner, such as shown and described in the drawing and in coassigned U.S. Pat. No. 3,847,564, which is incorporated herein by reference, may be used to introduce the feedstreams into the partial oxidation gas generator. For example, with respect to U.S. Pat. No. 3,847,564, free-oxygen containing gas may be simultaneously passed through the central conduit 18 and outer annular passage 14 of said burner. The free-oxygen containing gas is selected from the group consisting of substantially pure oxygen i.e. greater than 95 mole % $O_2$, oxygen-enriched air i.e., greater than 21 mole % $O_2$, and air. The free-oxygen containing gas is supplied at a temperature in the range of about 100° F. to 1000° F. the aqueous slurry of sewage sludge and solid carbonaceous fuel e.g. coal and/or petroleum coke is passed through the intermediate annular passage 16 at a temperature in the range of about ambient to 650° F.

The burner assembly is inserted downward through a top inlet port of the noncatalytic synthesis gas generator. The burner extends along the central longitudinal axis of the gas generator with the downstream end discharging a multiphase mixture of fuel, free-oxygen containing gas, and temperature moderator e.g. $H_2O$, $CO_2$, $N_2$ directly into the reaction zone. Atomization and intimate mixing of the feed streams takes place near the tip of the burner where the streams impact each other.

The relative proportions of the fuel, water and oxygen in the feedstreams to the gas generator are carefully regulated to convert a substantial portion of the carbon in the fuel, e.g. up to about 90% or more by weight, to carbon oxides; and to maintain an autogenous reaction zone Preferably the temperature in the gasifier is in the range of about 2200° F. to 2800° F., so that molten slag is produced. Further, the weight ratio of $H_2O$ to carbon in the feed is in the range of about 0.2 to 3.0, such as about 1.0 to 2.0. The atomic ratio of free-oxygen to carbon in the feed is in the range of about 0.8 to 1.4, such as about 1.0 to 1.2. Advantageously, the high amount of combined oxygen in the sewage sludge reduces the amount of free-oxygen.

The dwell time in the reaction zone is in the range of about 1 to 10 seconds, and preferably in the range of about 2 to 8 seconds. With substantially pure oxygen feed to the gas generator, the composition of the effluent gas from the gas generator in mole % dry basis may be as follows: $H_2$ 10 to 60, CO 20 to 60, $CO_2$ 5 to 40, $CH_4$ 0.01 to 5, $H_2S$+COS 0 to 5, $N_2$ nil to 5, and Ar nil to 1.5. With air feed to the gas generator, the composition of the generator effluent gas mole % dry basis may be about as follows: $H_2$ 2 to 20, CO 5 to 35, $CO_2$ 5 to 25, CH 0 to 2, 1 $H_2S$+COS 0 to 3, $N_2$ 45 to 80, and Ar 0.5 to 1.5. Unconverted carbon, ash, or molten slag are contained in the effluent gas stream. Depending on the composition and use, the effluent gas stream is called synthesis gas, reducing gas, or fuel gas. Coal has a high ash content e.g. about 10 to 30 wt.%. It was unexpectedly found that advantageously the coal ash will encapsulate the non-combustible materials in the sewage sludge. The encapsulated material will flow from the reaction zone of the gas generator as substantially inert molten slag. In the various embodiments herein, the solid carbonaceous fuel may be provided as a pumpable slurry of coal and/or petroleum coke in a liquid medium selected from the group consisting of water, liquid hydrocarbon, liquid hydrocarbonaceous fuel, and mixtures thereof.

The hot gaseous effluent stream from the reaction zone of the synthesis gas generator is quickly cooled below the reaction temperature to a temperature in the range of about 250° F. to 700° F. by direct quenching in water in a quench tank, or by indirect heat exchange for example with boiler feed water in a waste heat boiler to produce steam. The effluent gas stream from the gasifier may be cleaned and purified by conventional methods. For example, reference is made to coassigned U.S. Pat. No. 4,052,176, which is included herein by reference for removal of $H_2S$, COS and $CO_2$, from the effluent gas stream in a conventional gas purification zone.

In one embodiment, an additive is introduced into the partial oxidation reaction zone along with the other feed materials in order to facilitate the encapsulation and removal as inert molten slag of the non-combustible materials found in the sewage sludge and in the ash of the solid carbonaceous fuel. The additive is selected from the group consisting of iron-containing material, calcium-containing material, silicon-containing material and mixtures thereof. About 0.1 to 10 parts by weight of additive is introduced into the gasifier for each part by weight of non-combustible materials. The iron-containing additive material is for example selected from the group consisting of iron, iron oxide, iron carbonate, iron nitrate, and mixtures thereof. The calcium-containing additive material is for example selected from the group consisting of calcium oxide, calcium hydroxide, calcium carbonate, calcium nitrate, calcium fluoride, calcium phosphate, calcium borate, and mixtures thereof. The silicon-containing additive material is for example selected from the group consisting of silica, quartz, silicates, volcanic ash, and mixtures thereof.

Clean synthesis gas as produced in the subject process may be used in the catalytic synthesis of organic chemicals. For example, methanol and acetic acid may be synthesized in accordance with the process described in coassigned U.S. Pat. No. 4,081,253, which is incorporated herein.

Fuel gas produced in the subject process may be burned in the combustor of a gas turbine. Flue gas from the combustor of the gas turbine may be the working fluid in an expansion turbine which powers an electric generator. The thermal energy in the turbine exhaust gas may be recovered in a heat recovery steam generator. For example, by indirect heat exchange with boiler feed water and the turbine exhaust gas, streams of low, medium and superheated steam may be produced for use in the process.

The turbine exhaust gas, also known as flue gas, substantially comprises $CO_2$, $N_2$ and $H_2O$ and about 1-10 volume of $O_2$. In one embodiment, the flue gas is used to heat treat the dewatered sewage sludge. The flue gas at a temperature in the range of about 150° F. to 300° F. comes in indirect contact with the highly dewatered sewage sludge in an autoclave. Heat treating takes place in the autoclave at a temperature in the range of about 350° F. to 650° F. in the absence of air for a residence time of about 1 to 45 minutes. The pressure in the reactor is at or above the vapor pressure of water at the heat treating temperature. A pumpable aqueous slurry of sewage sludge having a solids content in the range of about 20 to 50 wt.% is produced.

In one embodiment, a portion of fuel gas produced in the partial oxidation gas generator is used as the supplemental fuel in the partial oxidation gas generator. For example, the dewatered sewage sludge from the flash evaporator is passed directly through one passage of an annular-type burner. The burner is mounted in the top inlet port of the gas generator. The fuel gas is passed through another passage of the burner; and, free-oxygen containing gas is passed through one or two other passages in the burner. For example, in a burner with a central conduit and two concentric annular passages, a free-oxygen containing gas stream is passed through the central conduit, a pumpable aqueous slurry of dewatered sewage sludge is passed through the intermediate annular passage, and a stream of fuel gas is passed through the outer annular passage.

Still another embodiment pertains to a process for the production of fuel from sewage sludge for burning by complete combustion in a boiler or incinerator comprising:

(1) concentrating sewage sludge containing about 0.5 to 20 wt.% of solids by belt pressing to produce highly dewatered sewage sludge comprising about 15 to 65 wt% solids, and separating excess water from said dewatered sewage sludge;

(2) heating the sewage sludge from (1) in a reaction zone at a temperature in the range of about 130° F. to 200° F. in the absence of air for a residence time pressure, followed by heating at a temperature in the range of about 300° F. to 650° F. in the absence of air for a residence time of about 5 to 120 minutes and at a pressure which is at or above the vapor pressure of water at the heat treating temperature to produce a pumpable aqueous slurry of sewage sludge;

(3) reducing the pressure and corresponding temperature of the aqueous slurry of sewage sludge from (2) in a flash evaporization zone to a pressure in the range of about atmospheric pressure to the saturated vapor pressure of water at the temperature in said flash evaporation zone which is in the range of about 200° F. to 400° F. thereby evaporating and separating sufficient water from said sewage sludge to provide a pumpable slurry of dewatered sewage sludge having a solids content in the range of about 30 to 70 wt % and having a higher heating value (HHV) in the range of about 5,000 to 9,500 BTU/LB; and (4) mixing the slurry of dewatered sewage sludge from (3) with a supplemental fuel thereby providing a pumpable slurry fuel having a total solids content in the range of about 50 to 70 wt.% and comprising about 10 to 40 wt.% dewatered sewage sludge and having a higher heating value in the range of about 5,000 to 14,000 BTU/LB.

DESCRIPTION OF THE DRAWING

A more complete understanding of the invention may be had by reference to the accompanying drawing which illustrates a preferred embodiment of the invention. It is not intended to limit the subject invention to the particular process or materials described.

Municipal sanitary sewage sludqe having a solids content in the range of about 0.5 to 20 wt.%, say about 15 wt.%, and at a temperature in the range of about ambient to 212° F., say about 70° F. in line 1 is optionally mixed with a filter aid e.g. pulverized solid carbonaceous fuel from line 2. The mixture is passed through line 3 into belt filter press 4. Water leaves through line 5 and is sent to a conventional water purification system. The highly dewatered sewage sludge leaving belt filter press 4 by way of line 6 has a solids content in the range of about 20 to 50 wt.% and may be passed through line 7, valve 8 and lines 9 and 10 into reactor 15. Steam produced downstream in the process in waste heat boiler 16 is passed through line 17 to provide the thermal energy to heat the sewage sludge in reactor 15 by direct or indirect heat exchange. In another embodiment, the dewatered sewage sludge in line 6 is passed through line 19, valve 20, line 21 and into high intensity press 22 where additional pressing takes place. Water is removed through line 23 and sent to a conventional purification facility. The highly dewatered sewage sludge leaving high intensity filter press 22 through line 25 is passed through line 10 into reactor 15. The highly dewatered sewage sludge is heated in reactor 15 at a temperature in the range of about 130° F. to 650° F. for about 6 to 140 minutes in the absence of air and at a pressure which is at or above the vapor pressure of water at the reactor temperature. A pumpable aqueous slurry of sewage sludge is produced. Alternatively, the heat in reactor 31 may be provided by indirect heat exchange with flue gas produced downstream in the process in expansion turbine 35 and delivered through line 36. Off-gas from reactor 15 is passed through line 26 and into a conventional gas purification unit (not shown).

The heat treated sewage sludge leaving reactor 15 through line 18 is introduced into flash evaporation zone 38. The pressure of the aqueous slurry of sewage sludge is reduced in zone 38 to a pressure in the range of about atmospheric pressure to the saturated vapor pressure of water at the temperature in zone 38. Sufficient water is evaporated and is removed through line 39. This water may be used in the preparation of aqueous slurries of solid supplemental fuel in mixer 41. A pumpable slurry of dewatered sewage sludge having a solids content in the range of about 30 to 50 wt.% leaves by way of line 40.

Supplemental carbonaceous fuel from line 42 is mixed with the aqueous slurry of dewatered sewage sludge from line 40 in mixer 41 to provide a pumpable fuel having an increased HHV. For example, a liquid hydrocarbonaceous fuel or an aqueous slurry of solid carbonaceous from line 42 is mixed with the highly dewatered sewage sudge from line 40 in mixer 41. The resulting pumpable mixture having an HHV in the range of about 5,000 to 14,000 BTU/Lb is introduced into a conventional free flow refractory lined noncatalytic partial oxidation synthesis gas generator 49 by way of line 50 and outer annular passage 51 of burner 52. A free-oxygen containing gas e.g. air in line 53 at a temperature in the range of about ambient to 1,000° F. is passed through center conduit 54. Burner 52 is vertically mounted in upper central port 55 of gasifier 49.

Hot raw effluent gas comprising $H_2$, CO, $CO_2$, $H_2O$, $N_2$ and $CH_4$ leaves at the bottom of gasifier 49 through line 56 2600° F. in a waste heat boiler 16. Alternatively, the hot raw effluent gas stream is quenched in water (not shown). Boiler feed water in line 37 is converted into steam in WHB 16 and leaves by way of line 17. The partially cooled raw gas stream in line 60 at the top of WHB 16 is scrubbed with water and solvents in conventional gas cleaning and purification zone 61. Depending upon the operating conditions and feedstock, synthesis gas is removed from zone 61 by way of line 62, valve 63 and line 64. Alternatively, fuel gas is removed from zone 61 for use elsewhere in the process by way of line 65, 66, valve 67 and line 68 having a heat content of about 180-350 BTU/SCF. This fuel gas may be passed through line 70, valve 71 and line 72 and into combustor 73. Complete combustion of the fuel gas with air from line 74 takes place in combustor 73. Flue gas is passed through line into expansion turbine 35 which drives electric generator 76. Alternatively, in one embodiment, the heat treated dewatered sewage sludge in line 40 is passed directly through a first annular passage in a burner provided with a central conduit and two concentric annular passages. Said burner would be located in the top of gasifier 49 in place of burner 52. Free-oxygen containing gas would be passed through the central conduit, and fuel gas from line 68 would be passed through a second annular passage in said burner. In such case, mixer 41 would not be used, and mixing of the sewage sludge and fuel gas would take place in the gasifier. The process of the invention has been described generally and by examples with reference to materials of particular composition for purposes of clarity and illustration only. It will be apparent to those skilled in the art from the foregoing that various modifications of the process and materials disclosed herein can be made without departure from the spirit of the invention.

We claim:

1. A process for the partial oxidation of sewage sludge comprising:
   (1) concentrating sewage sludge containing about 0.5 to 20 wt.% solids in a belt filter pressing zone to produce highly dewatered sewage sludge comprising about 15 to 65 wt% solids, and separating excess water from said dewatered sewage sludge, wherein said sludge is concentrated by sequentially pressing said sewage sludge in a continuous belt pressure filtering zone with a first pressing at a surface pressure in the range of about 20 to 200 pounds per square inch for a period in the range of about ½ to 60 minutes followed by a second pressing with a surface pressure of about 200 pounds per square inch for a period in the range of about ½ to 60 minutes;
   (2) heating the sewage sludge from (1) in a reaction zone at a heat treading temperature in the range of about 130° F. to 200° F. in the absence of air for a residence time of about 1 to 20 minutes and at atmospheric pressure, followed by heating at a heat treating temperature in the range of about 300° F. to 650° F. in the absence of air for a residence time of about 5 to 120 minutes and at a pressure which is at or above the vapor pressure of water at the heat treating temperature to produce a pumpable aqueous slurry of sewage sludge;
   (3) reducing the pressure and corresponding temperature of the aqueous slurry of sewage sludge from (2) in a flash evaporization zone to a pressure in the range of about atmospheric pressure to the saturated vapor pressure of water at the temperature in said flash evaporation zone which is in the range of about 200° F. to 400° F. thereby evaporating and separating sufficient water from said sewage sludge to provide a pumpable slurry of dewatered sewage sludge having a solids content in the range of about 30 to 70 wt.% and having a higher heating value (HHV) in the range of about 5,000 to 9,500 BTU/LB;
   (4) mixing the slurry of dewatered sewage sludge from (3) with a supplemental fuel thereby providing a pumpable slurry having a total solids content in the range of about 50 to 70 wt.% and comprising about 10 to 40 wt.% dewatered sewage sludge and having a higher heating value in the range of about 5,000 to 14,000 BTU/LB; and,
   (5) partially oxidizing the pumpable slurry from (4) with a stream of free-oxygen containing gas and a temperature moderator in the reaction zone of a gas generator at a temperature in the range of about 1800° F. to 3000° F. and a pressure in the range of about 1 to 30 atmospheres to produce a hot raw effluent stream of at least one gas from the group consisting of synthesis gas, reducing gas and fuel gas.

2. The process of claim 1 wherein additional dewatering is provided by heating the sludge to a temperature in the range of about 100° to 140° C. during said high intensity pressing.

3. The process of claim 1 wherein additional dewatering is provided by pressing in (1) said sewage sludge while in admixture with a filter aid having particle size of less than 2 mm.

4. The process of claim 3 wherein said filter-aid is a pulverized solid fuel.

5. The process of claim 3 wherein said filter aid is selected from the group consisting of coal fines, and CaCO$_3$.

6. The process of claim 1 wherein said concentrating takes place before any significant bacterial action occurs that consumes carbon and organic materials in said sewage sludge.

7. The process of claim 1 wherein the sewage sludge in (2) is heated to the desired temperature by direct or indirect heat exchange with steam or synthesis gas.

8. The process of claim 7 wherein said steam is produced downstream in the process by indirect heat exchange between boiler feed water and said hot raw effluent gas stream from (5).

9. The process of claim 1 wherein clean water at a temperature in the range of about 300° F. to 500° F. is produced in the reaction zone of (2), and said water is separated from the sewage sludge and passed in indirect heat exchange with the highly dewatered sewage sludge from (1).

10. The process of claim 1 wherein hot water at a temperature in the range of about 200° F. to 500° F. is separated in (3), and said water is passed in indirect or direct heat exchange with the sewage sludge from (1) to heat said sewage sludge in (2).

* * * * *